United States Patent [19]

Cole et al.

[11] 4,079,120

[45] Mar. 14, 1978

[54] URANIUM DIOXIDE CALCINING APPARATUS AND METHOD

[75] Inventors: Edward A. Cole; Robert S. Peterson, both of Columbia, S.C.

[73] Assignee: Westinghouse Electric Corporation, Pittsburgh, Pa.

[21] Appl. No.: 425,758

[22] Filed: Dec. 18, 1973

[51] Int. Cl.$^2$ .............................................. C01G 43/02
[52] U.S. Cl. .............................. 423/261; 252/301.1 R; 23/279; 23/284
[58] Field of Search ................. 252/301.1 R; 423/261; 23/279, 284

[56] References Cited

U.S. PATENT DOCUMENTS 3,871,829    3/1975    Keith et al. .......................... 423/261

*Primary Examiner*—Stephen J. Lechert, Jr.

[57] ABSTRACT

This invention relates to an improved continuous calcining apparatus for consistently and controllably producing from calcinable reactive solid compounds of uranium, such as ammonium diuranate, uranium dioxide ($UO_2$) having an oxygen to uranium ratio of less than 2.2. The apparatus comprises means at the outlet end of a calciner kiln for receiving hot $UO_2$, means for cooling the $UO_2$ to a temperature of below 100° C and conveying the cooled $UO_2$ to storage or to subsequent $UO_2$ processing apparatus where it finally comes into contact with air, the means for receiving, cooling and conveying being sealed to the outlet end of the calciner and being maintained full of $UO_2$ and so operable as to exclude atmospheric oxygen from coming into contact with any $UO_2$ which is at elevated temperatures where it would readily oxidize, without the use of extra hydrogen gas in said means.

5 Claims, 3 Drawing Figures

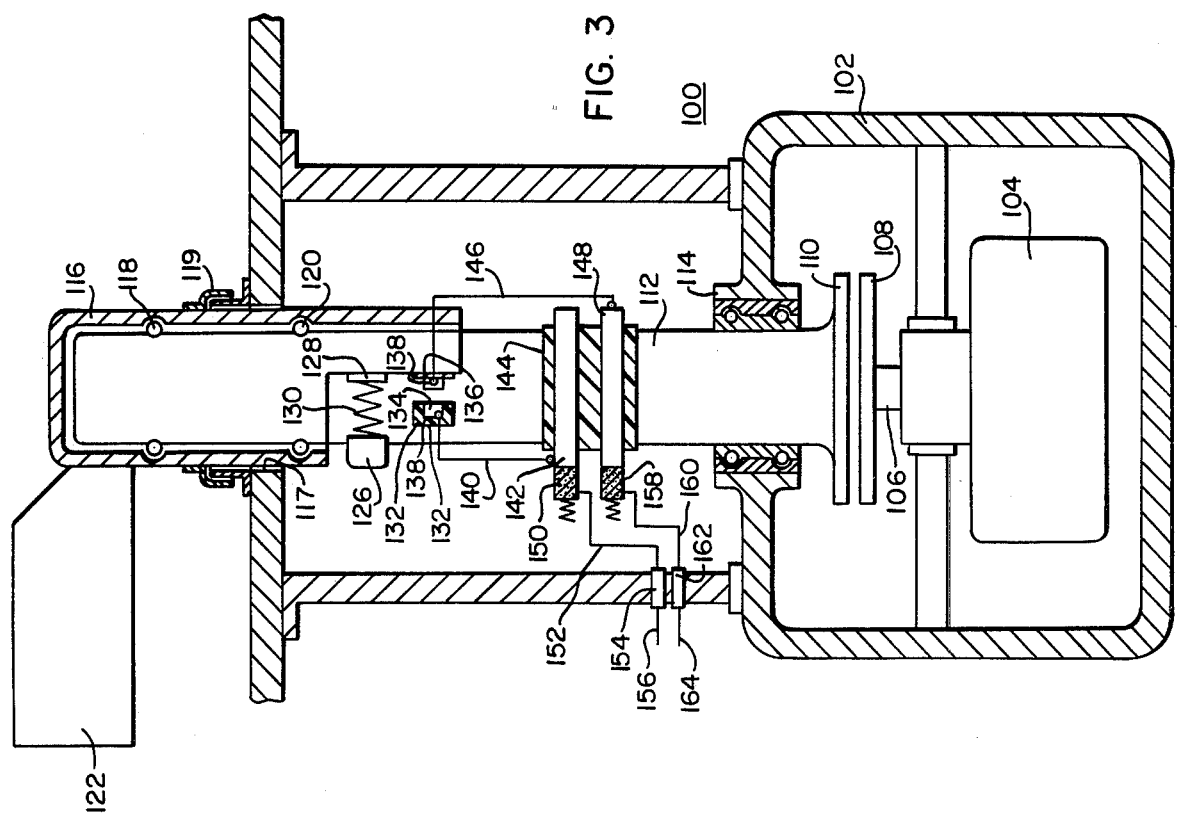
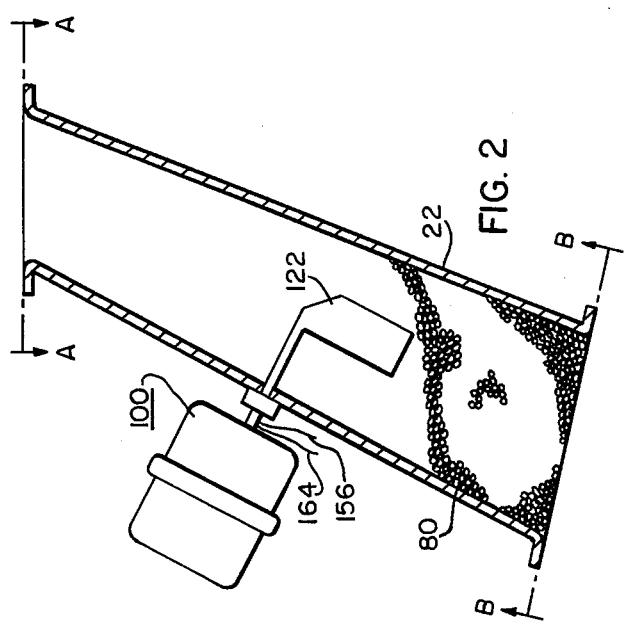

URANIUM DIOXIDE CALCINING APPARATUS AND METHOD

BACKGROUND OF THE INVENTION

The present invention relates to the preparation of $UO_2$ for nuclear fuel elements, and in particular to consistently and economically calcining reducible, reactive compounds of uranium, such as ammonium diuranate (ADU) to produce $UO_2$ with an oxygen to uranium ratio of close to 2, and preferably less than 2.2.

PRIOR ART

A general teaching of the production of $UO_2$ from an enriched uranium gas such as enriched uranium hexafluoride, is set forth in an article entitled "ADU Process is Big Contender in Race to Meet Nuclear Power's Fuel Needs" by James H. Prescott on pages 146 to 148 of the May 6, 1968 issue of "Chemical Engineering".

U.S. Pat. No. 3,579,311 teaches the operation of a rotary calciner kiln for converting ADU to uranium dioxide. The patent does not teach any means for keeping air from contacting the hot $UO_2$ product coming out of the discharge opening in the rotary kiln.

Googin U.S. Pat. No. 3,037,839 is directed to the preparation of a precipitate of ammonium-uranyl and its decomposition in a kiln-type reactor to $UO_2$. The reoxidation of the $UO_2$ in air at room temperature is alleged to occur.

SUMMARY OF THE INVENTION

According to the present invention, hot uranium dioxide is produced by calcining in a rotary kiln a calcinable reactive solid compound of uranium, such for example as ammonium diuranate (ADU), the $UO_2$ solids are discharged at the outlet of the kiln into a sealed chute and thence fed into a cooling and conveyor means comprising means for moving the uranium dioxide from the chute and through the cooling means and to pass the uranium dioxide cooled to the temperature of below 100° C, into suitable storage or subsequent processing means. The chute and means for cooling and conveying the hot $UO_2$ are controllably operated so that they form a system which is kept filled with $UO_2$ solids up to the point where it finally is sufficiently cooled down that it will not react with the atmosphere and passes on to exterior apparatus and comes in contact with the atmosphere. In particular, the $UO_2$ powder solids discharged from the calcining kiln form a solid heap within the lower portion of the chute and are maintained in a dense packed state within the conveying and cooling means so that no air can penetrate to those portions of the $UO_2$ that are at a temperature above 100° C and particularly in the temperature range where the $UO_2$ will react with additional oxygen. The calcining kiln produces $UO_2$ with an oxygen to uranium ratio of between 2.0 and 2.2. It is desirable that this ratio of oxygen to uranium be maintained. The present apparatus and the control means associated with it insure that no atmospheric oxygen reaches any hot $UO_2$. Nevertheless the conveying means discharges cooled $UO_2$ freely into contact with the atmosphere.

The prior art practice for handling hot $UO_2$ discharged from a calcining kiln required a continuous protective flow of hydrogen at the outlet end of the kiln in order to react with any oxygen that reached this area so that the $UO_2$ is not appreciably further oxidized while it was both cooled and conveyed for further treatment or to storage. It will be appreciated that substantial amounts of hydrogen were required for such operations. The necessity for the use of hydrogen at the outlet end of the kiln arose by reason of the fact that the $UO_2$ kiln output is a solid comprising lumps of various sizes admixed with fine powder and was of a highly irregular consistency. The kiln output flow of such $UO_2$ also was irregular and consequently the conveying means carrying it through the cooling zone was not filled and permitted the access of atmospheric air to the hot $UO_2$ where it "burned" to form some $U_3O_8$.

BRIEF DESCRIPTION OF THE DRAWINGS

FIG. 2 is a vertical section through the portion between lines AA and BB in FIG. 1 of the drawing; and FIG. 3 is a fragmentary vertical cross section through a suitable control means.

DETAILED DESCRIPTION OF THE INVENTION

Figure 1:
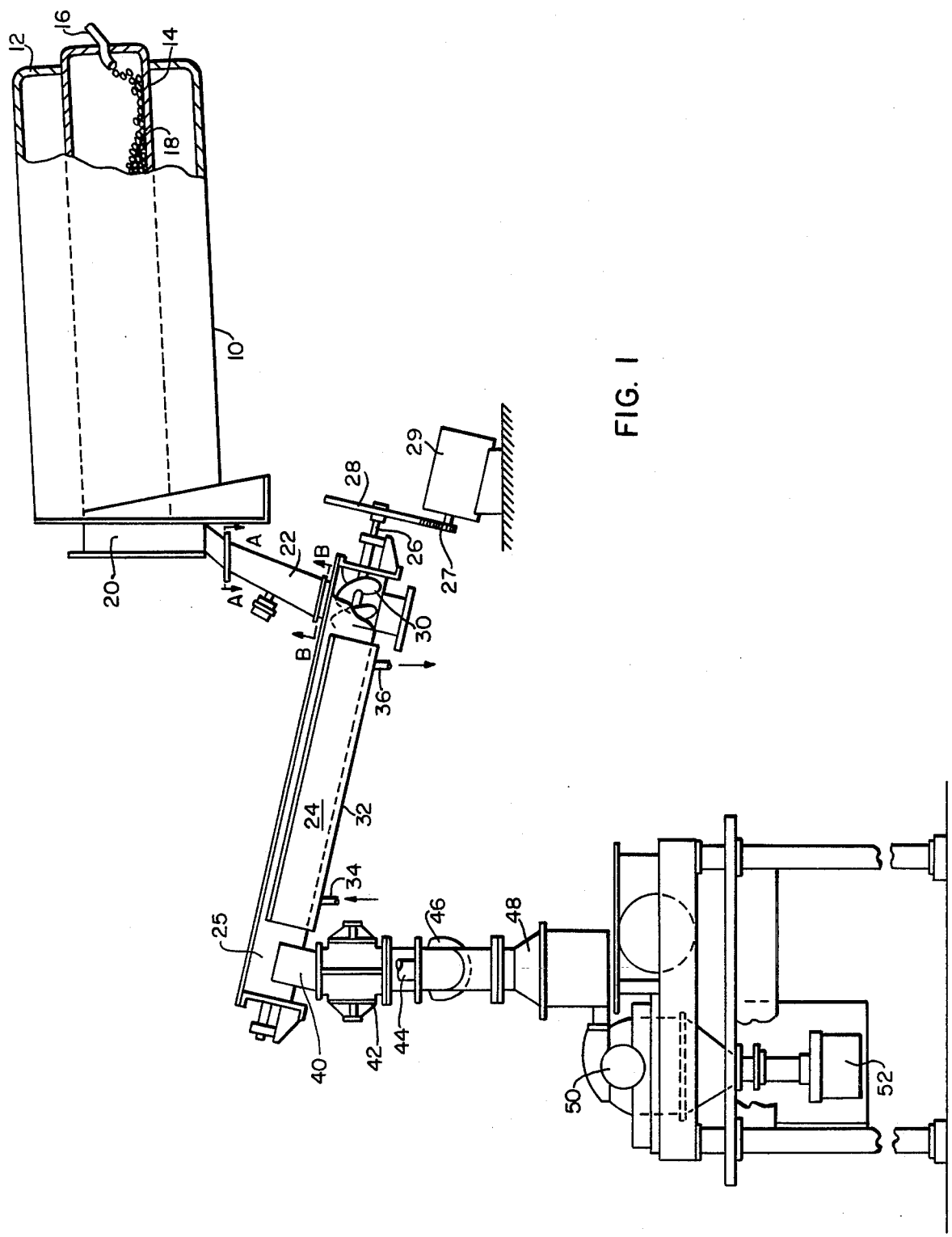
FIG. 1 is a side elevation of a kiln with the improved discharge control means associated therewith.

Referring to FIG. 1 of the drawings, there is illustrated a rotatable calcining kiln apparatus 10 for converting ADU to $UO_2$. Briefly, the kiln apparatus 10 comprises an outer shell 12 within which is disposed a rotatable heated drum 14 into which ADU may be introduced by a tube 16 which deposits lumps or pellets of ADU sludge from a centrifuge which is a part of the apparatus which produces ADU from $UF_6$ gases. The drum 14 is heated to a temperature of over 500° C and up to 1000° C, in the presence of an atmosphere of steam and hydrogen which enter into reactions causing the conversion of the ADU to $UO_2$. It will be noted that the kiln is tilted slightly with respect to the horizontal so that the inlet end where tube 16 enters is higher than the discharge end 20. The discharge end 20 comprises a sealed chamber preventing entry of air, having attached to the lower end thereof a chute 22 into which the hot $UO_2$ solids in the form of lumps and powder drops. The chute is hermetically attached at its lower end to an upwardly tilted elongated conveyor 24 provided with means such as an internal screw, for slowly moving the $UO_2$ along its length.

The conveyor 24 comprises a sealed elongated steel shell 25 through which passes a rotatable shaft 26 driven by an external gear 28 connected to a drive pinion 27 of a motor 29. The shaft 28 is provided with a helical screw 30 so that it slowly moves and concurrently stirs any $UO_2$ dropping at the right-hand end thereof upwardly to the left-hand end of the conveyor 24. The walls of the steel shell of conveyor 24 are surrounded by a jacket 32 into which water is introduced at an upper inlet 34 and is withdrawn at an outlet 36. The water so provided contacts the steel shell of the conveyor and thereby absorbs heat and cools the hot $UO_2$ as it slowly moves up the conveyor 24. The volume of $UO_2$ in the conveyor being moved slowly upwardly is substantial and constitutes the output of the calcining kiln over a substantial period of time of, for example ½ to 2 hours. By the time the $UO_2$ powder reaches the upper end of the conveyor 24, it has been cooled to a temperature of less than 100° C and is discharged into a pipe 40 from where it drops into a distributor 42 and from thence it can be moved through ducts 44 and 46 to a hopper 48. Hopper 48 is not hermetically sealed and air will come in contact with the $UO_2$. Air may also pass into the members 42, 44 and 46 but is prevented from passing into the conveyor 24 because it is kept fully packed with $UO_2$. From the hopper 48, the $UO_2$ may be introduced in suitable amounts to a mill 50 for comminuting the now cold $UO_2$ into a fine powder suitable for pelleting into nuclear fuel pellets. The comminuted $UO_2$ from mill 50 is collected in a storage vessel 52.

It will be appreciated that if the conveyor 24 and helical screw 30 are only partly filled and not packed tight with $UO_2$ from the lower end to the discharge pipe 40, atmospheric air will enter and thence react with the hot $UO_2$ at the lower end of the conveyor 24 whereby to oxidize the $UO_2$ to $U_3O_8$. Such reaction with oxygen would be highly undesirable. In order to prevent any access of atmospheric air with its oxygen content to the hot $UO_2$ discharged from the calciner 10, there is provided means for causing the motor 29 to operate at a slow rate or even to stop at times, depending on the quantity of $UO_2$ being produced in the kiln 10 and discharged into chute 22. The conveyor is so operated and controlled that it is at all times completely full and even packed tightly with $UO_2$ powder. It is particularly undesirable that the conveyor screw 30 operate when there is no $UO_2$ in the chute 22. Consequently there is present at all times at least a certain minimum level of $UO_2$ at the bottom of the chute and the lower end of screw conveyor 30 is always surrounded by a mass of $UO_2$.

It is a feature of the apparatus of the present invention that the chute 22 at all times be at least partly filled with hot $UO_2$ from the kiln before the conveyor screw 30 starts operating and the moment that the level of hot $UO_2$ in chute 22 falls below a certain point, the conveyor will stop. The means for effecting this controlled operation are illustrated in FIGS. 2 and 3 of the drawings. Briefly, the chute 22 has present therein at a selected distance, essentially a foot or so from the lower end thereof, a sensing control means 100 responsive to an accumulation of hot $UO_2$ up to this point, and the control means 100 controls the operation of the driving motor 29 for the screw 30.

The control means 100 includes a rotatable sensor paddle 122 which will keep rotating until sufficient $UO_2$ powder forms a mass 80 which reaches a level at which it will contact and impede the turning of the sensor paddle 122. When this occurs, a slip clutch means will permit the paddle 122 to stop turning without damage, but, more importantly, the paddle stoppage will cause a control switch to energize the motor 29 to cause the helical screw 30 to rotate and to feed $UO_2$ from the mass 80 in chute 22 into the conveyor. When the mass 80 of $UO_2$ has dropped so that the paddle 122 can again freely rotate the circuit to the motor is interrupted so that motor 29 will cease operating until additional $UO_2$ has accommodated in chute 22 to impede paddle 122 turning. It this way, the lower end of chute 22, the screw 30 and conveyor 24 will be always completely filled with $UO_2$.

Referring to FIG. 3, of the drawings, there is shown details of an exemplary embodiment of a suitable sensor and control means 100. Briefly, the means 100 comprises a sealed casting 102 attached to the walls of the chute 22 in a hermetical or gas tight relationship. Within the casing is disposed an electric motor 104 having a drive shaft 106 coupled at its upper end to a magnetized disk 108 having, for instance, suitable north and south magnetic poles disposed along its peripheral upper surface. The motor drives shaft 106 at a relatively low speed of, for instance 30 to 60 RPM.

Closely adjacent and separated by only a narrow air gap from disk 108 is a second magnetically coupled disk 110 which will rotate with the movement of the disk 108 unless a substantial restraining force is applied to the upper disk 110. The disk 110 is coupled to a shaft 112 mounted in a ball bearing unit 114. The upper end of the shaft 112 extends into the chute 22 through an aperture 117 provided in the wall of the chute. A sleeve 116 rotatably mounted by ball bearings 118 and 120 is attached to the upper end of the shaft 112. The paddle 122 is affixed to the sleeve 116 for rotation therewith. A labyrinth seal 119 is provided between sleeve 116 and the walls of the chute 22 to prevent any $UO_2$ powder from passing into the casing 102.

A projection 126 is affixed to the shaft 112 for coaction with a projection 128 on sleeve 116 through a compression spring 130 disposed between them. Consequently, as the shaft 112 rotates (clockwise as viewed from the motor 104) the projection 126 pushes against spring 130 and thereby pushes against projection 128 and causes the sleeve 116 to rotate therewith. It will be appreciated that the spring 130 provides for a resilient connection between the shaft 112 and the sleeve 116 and whenever the paddle 122 meets any substantial impediment the spring 130 will be compressed so that the sleeve 116 will move counterclockwise with respect to the shaft 112. This motion of sleeve projection 128 wll be from right to left as seen in FIG. 3.

Immediately below the projections 126 and 128 there is placed on the shaft 112 a layer of electrically insulating material 132 on which is mounted an electrical contact 134 while on the sleeve 116 there is mounted a second insulating layer 136 on which is disposed a second electrical contact 138. Contacts 134 and 138 are disposed on the circumference of the same diametrical cross-section through shaft 112. The space between contacts 134 and 138 is smaller than the distance between the projections 126 and 128 so that when the paddle 122 meets some substantial impediment and stops the spring 130 will be compressed so that the sleeve 116 will move with respect to shaft 112 and the contacts 134 and 138 will come into contact with each other. Contact 134 is connected by a conductor 140 to a ring conductor 142 mounted on an insulating sleeve 144 wrapped on shaft 112. Similarly, contact 138 is connected by a conductor 146 to a second conductive ring 148, separated from ring conductor 142 and also mounted on the insulating sleeve 144. Associated with and in continual contact with the ring 132 is a resiliently mounted brush 150 to which is affixed a conductor 152 which passes through a hermetic insulating bushing 154 through the walls of the casing 102 to an external lead 156. A second resiliently mounted brush 158 is maintained in contact with the ring 148 and has a conductor 160 affixed thereto and passing through an insulated hermetic bushing 162 through the wall of the casing 102 and then to an external lead 164. Brushes 150 and 158 are supported from the walls of casing 102 in suitable holders. The leads 156 and 164 are connected to a control or switch mechanism in a well known manner to control the operation of the motor 29 so as to cause the motor 29 to operate when the contacts 134 and 138 touch each other and complete an electrical circuit.

It will be appreciated that the motor 104 operating through the magnetically coupled disks 108 and 110 will drive the paddle 122 as long as there is no strong impediment or resistance to the paddle turning. However, when a substantial heap 80 of $UO_2$ accumulates so that the paddle 122 strikes this heap it will stop. The shaft 112 will turn only a fraction of a turn more because of the magnetic torque between disks 108 and 110 to cause spring 130 to compress until contacts 134 and 138 touch each other. The magnetic attraction between disk 108 and disk 110 will continue to apply a torque on shaft 112 so that the spring 130 is compressed as long as there is any UO$_2$ in a heap 80 interferring with the turning of the paddle 122. However, once sufficient UO$_2$ has been discharged from chute 22 by movement of the screw conveyor 30 so that the top of heap 80 no longer restrains paddle 122, the paddle will be freed so that spring 130 will then function to cause the sleeve 116 to turn with respect to shaft 112 and the contacts 134 and 138 will be separated and the circuit through conductors 160-164 will be broken so that the drive motor 29 will stop. The slip clutch comprising magnetically coupled disks 108 and 110 will cause the shaft 112 to rotate until additional UO$_2$ piles up in a heap 80 and interferes with the turning of paddle 122. Consequently, at all times, the conveyor 24 with the conveyor helical screw 30 operating therein will be completely filled at its low end with hot UO$_2$ powder from chute 22 and will turn only to move UO$_2$ to the upper end thereof when the conveyor screw is insured of a continuous supply of UO$_2$ being available in chute 22. The flights of the helical screw 30 will be packed solidly with UO$_2$ powder at all times. Consequently, no air can penetrate past the area where the outlet 40 joins the conveyor because of presence of the solid mass of UO$_2$ powder filling the entire conveyor 24.

A system corresponding to the above described invention has been put into operation in a plant producing UO$_2$ on a commercial scale from ADU. Before the control system of the present invention was supplied it was found necessary to provide 2.3 pounds of hydrogen per hour to the calciner 10. Over half of this hydrogen was required to provide an excess of hydrogen at the outlet of the calciner kiln in order to react with and remove all of the free oxygen which would otherwise come into contact with the hot UO$_2$. Even then the ratio of oxygen to uranium in the UO$_2$ averaged approximately 2.3. After the installation of the present invention in the same calciner apparatus the amount of hydrogen used dropped to 1.1 pounds per hour. Furthermore, the average ratio of oxygen to uranium in the UO$_2$ is now 2.1. Consequently, better uranium dioxide is being produced with a saving of almost one-half the hydrogen previously required in the operation of the calciner.

While the above apparatus has been disclosed specifically with reference to calcining of UO$_2$, the apparatus can be employed with other materials which pass from an oven or kiln and must be protected from contact with the air until they cool sufficiently.

We claim:

1. In calcining apparatus for reducing compounds of uranium by heating the compounds to temperatures of up to about 1000° C to produce UO$_2$ powders of uniform quality and of an oxygen content not exceeding 2.2 atoms of oxygen per atom of uranium, said calcining apparatus comprising a rotary kiln, discharge meas and cooling means, said discharge means having an inlet end operatively joined in substantially air tight sealing relationship to the rotating kiln, the discharge means receiving and holding a predetermined amount of hot UO$_2$ from the rotary kiln without contact with air, said cooling means including an elongated member having an inlet and an outlet, heat dissipating and powder conveying means operatively associated therewith, through which the hot UO$_2$ powder passes for cooling to a temperature of below about 100° C at least at the outlet of the elongated member at which only cool UO$_2$ will be exposed to the ambient atmosphere, the inlet of the cooling means being disposed in air sealing relationship with the outlet of the discharge means said powder conveying means cooperating with the elongated member to cause UO$_2$ powder to pass therethrough from the inlet to the outlet end, the powder conveying means also being operable in concert with the elongated member to fill the elongated member completely with UO$_2$ powder and means for controlling the operation of the conveying means so that it operates to move UO$_2$ powder in the elongated member only when a predetermined amount of hot calcined UO$_2$ is present in the discharge means said cooling means when filled with UO$_2$ preventing entry of the atmosphere and thereby preventing oxygen gas reaching any hot UO$_2$, and only cool UO$_2$ with an oxygen to uranium ratio of less than 2.2 is discharged from the outlet of the elongated member.

2. The apparatus of claim 1, wherein the conveying means is a helical screw member extending over substantially the length of the elongated member for moving and stirring the UO$_2$ powder so that good thermal contact to the heat dissipating means is maintained.

3. The apparatus of claim 1, wherein the means for controlling the operation of the powder conveying means comprises a motor and switch means for energizing the motor, the switch means being operable by a sensor control means located in the discharge means said control means being responsive to the level of hot calcined UO$_2$ powder in the discharge means to energize the motor to cause operation of the conveying means when the UO$_2$ powder level is above a certain point in the discharge means and to stop the motor when the UO$_2$ powder level is below the certain point.

4. The apparatus of claim 1, wherein the elongated member is sufficiently long and of a cross-section so that the volume of UO$_2$ powder therein is so large that it will comprise the UO$_2$ output of the calcining apparatus over a long period of time so that heat from the hot calcined UO$_2$ will be adequately dissipated and the UO$_2$ is cooled to below about 100° C by the time it reaches the outlet of the tube member.

5. In the process of producing UO$_2$ powder of uniform quality and having an average of less than 2.2 atoms of oxygen per atom of uranium, from a reducible compound of uranium, the steps comprising introducing the uranium compound at a selected relatively uniform rate into a calciner, heating the uranium compound to a temperature of up to about 1000° C and subject it to hydrogen and steam to reduce the compound to UO$_2$ having an average of less than 2.2 atoms of oxygen per atom of uranium, passing the hot UO$_2$ to an elongated discharge member operatively connected to the calciner to exclude entry of the ambient atmosphere to the calciner or coming in contact with hot UO$_2$, cooling the UO$_2$ as it passes through the elongated discharge member by absorbing heat through contact with the surfaces of the discharge member so that its temperature is less than about 100° C when it reaches the outlet of the discharge member and meets the ambient atmosphere, completely filling the elongated discharge member with the UO$_2$ powder, controlling the passage of hot UO$_2$ from the calciner to the inlet end of the discharge member and leaving the outlet end of the elongated discharge member so as to maintain it substantially completely filled at all times with the UO$_2$ powder to provide good cooling thereof thereby to prevent entry of the outside atmosphere into the elongated dicharge means to where it can react with hot UO$_2$ to oxidize it further, and to prevent any entry of the atmosphere into the calciner.

* * * * *